United States Patent Office 3,536,617
Patented Oct. 27, 1970

---

3,536,617
PROCESS FOR NEUTRALIZING AND CLEANING AN ACID SOLUTION CONTAINING AN OIL
John M. Collins, Sarnia, Ontario, Canada, assignor to Ethyl Corporation of Canada Limited, Toronto, Ontario, Canada, a corporation of Canada
No Drawing. Filed Mar. 10, 1969, Ser. No. 805,803
Int. Cl. C02b 1/30
U.S. Cl. 210—44                      11 Claims

ABSTRACT OF THE DISCLOSURE

A process for neutralizing and cleaning an oil contaminated acid solution, such as results from the hydrolysis of a heavy ends stream from a process for the manufacture of ethyl chloride by reaction of ethylene and hydrogen chloride in the presence of aluminum chloride catalyst, by passing the solution downward through a flooded bed containing a carbonate, such as in limestone or claim shells, reacting the acid with the carbonate to form carbon dioxide, and allowing the carbon dioxide to pass upward through the bed.

BACKGROUND OF THE INVENTION

The present invention finds broad utility in a large number processes wherein it is desirable to neutralize an acid solution containing an oil. In particular, it has been found invaluable in the neutralization and cleanup of the oil contaminated water resulting from the hydrolysis of a heavy ends stream from a process for manufacture of a halogenated hydrocarbon, such as ethyl chloride, by the reaction of ethylene and hydrogen chloride, in the presence of a metal halide catalyst such as aluminum chloride. The referred to heavy ends are a byproduct residue typically having a composition in the ethyl chloride process of 1 to 8 percent chlorinated hydrocarbons and 30 to 45 percent aluminum chloride, the balance being a polymer oil. By treating this residue with water (hydrolysis), a more easily handled oily waste material results. The water used to hydrolyze the aluminum chloride portion of the residue becomes contaminated with hydrochloric acid, oil and some particulate matter, and it must be cleaned up prior to discharge as a plant effluent stream. Neutralization of the stream by an art known procedure requires trickling the stream in a horizontal direction through a bed of crushed limestone or clam shells. The service life of such a bed is quite short due to the coating of the stone or shells with an oil scum. This scum will, in time, cover the surface of the stone or shells, thereby stopping the neutralizing reaction. To overcome the problem of oil coating the stone or shells, the prior art makes extensive use of commercially available oil-water separation equipment with expensive corrosion resistant materials of construction, prior to the neutralization step.

By contrast, in accordance with the process of the present invention the bed remains clean and is slowly, completely eaten away during the neutralization process. New bed material may be added as desired without difficulty. The oil-water separation and particulate removal is accomplished at the same time without the use of other expensive oil-water separation equipment.

SUMMARY OF THE INVENTION

The present invention provides a process for neutralizing and cleaning an acid solution containing an oil, comprising, in combination, the steps of passing the solution downward through a flooded bed containing carbonate, reacting the acid in said solution with said carbonate to form carbon dioxide and allowing said carbon dioxide to pass upward through said bed, stripping said oil from the water and holding it at the surface of the water as froth for removal. If particulate matter is present in the acid solution, it will be removed with the oil.

DESCRIPTION OF THE PREFERRED EMBODIMENTS

Neutralization of acid streams has been effected in the prior art by horizontally trickling the streams through beds of crushed limestone or clam shells. When the acid stream contains oil, the beds have had limited service due to the formation of an oil scum over the surface of the stone or shells which stopped the neutralization reaction.

In accordance with the present invention it has been demonstrated that vertical percolation of the acid water downward through the flooded limestone bed will result in a continuing operation with no coating of the stone with scum. Carbon dioxide, evolved from the reaction of an acid, such as hydrochloric acid, with a carbonate, such as calcium carbonate, bubbles upward through the bed and carries the oil droplets and any particulate matter present to the liquid surface and holds them there by gas floatation. Any other materials lighter than water, such as most hydrocarbons, which are present are also kept at the surface and do not escape to the effluent. The froth layer can be skimmed off and disposed of as seen fit. The bubbles of carbon dioxide, having prevented the oil and any particulate matter from settling on the stone, shells or other form of the carbonate, escape from the surface of the froth and liquid and are vented to the atmosphere. As the carbonate is used up, additional carbonate may be added to replenish the bed. This carbonate may be dumped onto the bed during the reaction without first removing either the existing froth on the liquid surface above the bed or the older partly used carbonate in the bed. Any froth which is carried down with the newly added carbonate is immediately gas-lifted back to the liquid surface above the bed by the carbon dioxide evolving from the vigorous reaction surrounding the added carbonate.

In order that those skilled in the art can thus appreciate the process of this invention, the following examples are given by way of description and not by way of limitation.

EXAMPLE I

8 U.S. gal./min. of water used in the hydrolysis of heavy ends (from a reaction involving ethylene hydrochlorination to ethyl chloride in the presence of aluminum chloride) having a pH of 0.6, an hydrochloric acid content of 3.6 weight percent, a particulate matter loading of 560 parts per million by weight, and a polymer oil content of 3300 parts per million by weight were admitted to the top of a completely flooded bed of 2000 lbs. of crushed limestone. The water percolated downward through the bed and the effluent emerged from the bottom with a pH of 3.5, an hydrochloric acid content of zero weight percent, a particulate matter loading of 100 parts per million by weight, and a polymer oil content of 15 parts per million by weight. Carbon dioxide bubbled vigorously to the liquid surface above the bed carrying oil droplets and particulate matter with it to form a froth on the liquid surface. At the end of 96 hours the interior of the bed was inspected, and the limestone was found to be clean. The limestone was slowly eaten away, and during 96 hours total operation, 7000 pounds limestone were consumed by reaction with the acid water. All froth carried down by the newly added stone soon reappeared at the liquid surface above the bed, and no loss of efficiency of the bed was noted.

EXAMPLE II

The above example is repeated with clam shells instead of limestone and similar results are experienced.

As noted, the present invention finds broad utility in a large number of processes wherein it is desirable to neutralize an acid solution containing an oil or hydrocarbon and possibly some particulate matter. The present invention is also useful in neutralizing and cleaning steel pickling wastes, and the like, and for removing particulate matter from acid water by adding an oil to the acid water and recycling the oil as it is removed.

The present invention further includes the neutralization and cleanup of water used in the hydrolysis of waste halogenated aluminum alkyls. These waste aluminum alkyls and the associated particulate waste aluminum are often kept in a hydrocarbon solution. In addition, this invention extends to neutralization and cleanup of water used to scrub combustion gases resulting from the burning of a halogenated material. Even further, this invention is drawn to the neutralization and cleanup of wash water used in removing undesired halides from various petrochemical processes. The halide may have been introduced into the process as a raw material or as a catalyst. Other acid solutions requiring neutralization and cleanup are also within the scope of the present invention.

Among the acids included by the present invention are hydrogen chloride, hydrogen bromide, hydrogen iodide and hydrogen fluoride.

Particulate matter contemplated by this invention includes, among other forms, clays, sands, metal dusts and in general all undissolved solids which can be found in the acid stream or are released from the dissolved carbonate.

Among the preferred carbonates finding usefulness in this invention are calcium carbonate, calcium magnesium carbonate, magnesium carbonate, and iron carbonate.

What is claimed is:

1. A process for neutralizing and cleaning an acid solution containing an oil comprising, in combination, the steps of
   (A) passing the solution downward through a flooded bed containing carbonate;
   (B) reacting the acid in said solution with said carbonate to form carbon dioxide;
   (C) allowing said carbon dioxide to pass upward through said bed;
   (D) stripping said oil from said solution and holding it at the surface of said bed as froth for removal; and
   (E) removing the neutralized, cleaned solution from the bottom of said bed.

2. The process of claim 1 wherein:
   (A) the acid is hydrogen halide;
   (B) the oil is a liquid hydrocarbon; and
   (C) the carbonate is selected from the group consisting of calcium carbonate, calcium magnesium carbonate, magnesium carbonate, and iron carbonate.

3. The process of claim 2 wherein the carbonate is calcium carbonate in a naturally occurring material selected from the group consisting of limestone and clam shells.

4. The process of claim 3 wherein said acid solution is a hydrolyzed heavy ends stream from a process for the manufacture of a halohydrocarbon.

5. The process of claim 1 wherein said acid solution contains particulate matter which is removed with said froth.

6. The process of claim 1 wherein an oil is added to said acid solution to aid removal of particulate matter.

7. The process of claim 1 wherein said acid solution is a steel pickling waste.

8. The process of claim 1 wherein said acid solution is hydrolyzed waste halogenated aluminum alkyls.

9. The process of claim 1 wherein said acid solution comprises scrubbed combustion gases of a burned halogenated material.

10. The process of claim 1 wherein said acid solution is wash water used in removing undesired halides from a petrochemical process.

11. The process of claim 4 wherein the heavy ends are a by-product residue from a process for the manufacture of ethyl chloride by the reaction of ethylene and hydrogen chloride in the presence of aluminum chloride, said heavy ends having a composition of from about 1 to about 8 percent chlorinated hydrocarbons, from about 30 to about 45 percent aluminum chloride, and a polymer oil.

References Cited

UNITED STATES PATENTS

| 1,226,333 | 5/1917 | Hoskins | 210—44 |
| 1,426,596 | 8/1922 | Peck | 210—44 X |
| 1,430,182 | 9/1922 | Peck | 210—44 |
| 2,389,739 | 11/1945 | Pevere | 260—663 X |
| 2,876,863 | 3/1959 | Kivari | 210—44 X |
| 3,301,779 | 1/1967 | Kovacs | 210—44 |

FOREIGN PATENTS

| 955,321 | 4/1964 | Great Britain. |

MICHAEL E. ROGERS, Primary Examiner

U.S. Cl. X.R.

210—59; 260—663